(12) United States Patent
Fan et al.

(10) Patent No.: US 9,571,290 B2
(45) Date of Patent: Feb. 14, 2017

(54) NETWORK COUPLING DEVICE AND NETWORK COUPLING SYSTEM

(71) Applicant: BOTHHAND ENTERPRISE INC., Tainan (TW)

(72) Inventors: Chung-Cheng Fan, Taoyuan County (TW); Yi-Jheng Lin, Taoyuan County (TW); Ting-Yu Tai, Taoyuan County (TW); Chi-Chun Lin, Taoyuan County (TW); Hung-Yuan Cheng, Taoyuan County (TW)

(73) Assignee: BOTHHAND ENTERPRISE INC., Tainan (TW)

( * ) Notice: Subject to any disclaimer, the term of this patent is extended or adjusted under 35 U.S.C. 154(b) by 423 days.

(21) Appl. No.: 14/329,116

(22) Filed: Jul. 11, 2014

(65) Prior Publication Data

US 2015/0162953 A1 Jun. 11, 2015

(30) Foreign Application Priority Data

Dec. 9, 2013 (TW) .............................. 102145173 A (51) Int. Cl.
*H04B 3/56* (2006.01)
*H04L 12/10* (2006.01)

(52) U.S. Cl.
CPC ................. *H04L 12/10* (2013.01); *H04B 3/56* (2013.01); *H04B 2203/547* (2013.01); *H04B 2203/5483* (2013.01); *Y02B 60/33* (2013.01)

(58) Field of Classification Search
CPC ..... H04L 12/10; H04B 3/56; H04B 2203/547; H04B 2203/5483; Y02B 60/33
See application file for complete search history.

(56) References Cited

U.S. PATENT DOCUMENTS

| 6,640,308 | B1* | 10/2003 | Keyghobad | .......... | G05B 19/042 |
| | | | | | 370/254 |
| 2001/0015903 | A1* | 8/2001 | Peek | ...................... | H04B 3/542 |
| | | | | | 363/125 |
| 2010/0110741 | A1* | 5/2010 | Lin | ......................... | H02J 5/005 |
| | | | | | 363/127 |
| 2013/0314195 | A1* | 11/2013 | Chapman | .............. | H01F 27/255 |
| | | | | | 336/212 |

* cited by examiner

*Primary Examiner* — Jared Fureman
*Assistant Examiner* — Joel Barnett
(74) *Attorney, Agent, or Firm* — Muncy, Geissler, Olds & Lowe, P.C.

(57) ABSTRACT

A network coupling device includes a transformer module for transmitting a network signal from a network system, and a power processing module coupled to the transformer module and configured to transmit a direct current power signal from the network system. The transformer module and the power processing module satisfy a relation $|Z_T - Z_{T+L}| \leq 0.25 Z_T$ where $Z_T$ is an impedance of the transformer module when disconnected from the power processing module, and $Z_{T+L}$ is an effective impedance of the transformer module with the power processing module connected thereto.

17 Claims, 5 Drawing Sheets

NETWORK COUPLING DEVICE AND NETWORK COUPLING SYSTEM

CROSS-REFERENCE TO RELATED APPLICATION

This application claims priority of Taiwanese Application No. 102145173, filed on Dec. 9, 2013.

BACKGROUND OF THE INVENTION

1. Field of the Invention

The invention relates to a network coupling device and a network coupling system, more particularly to a network coupling device and a network coupling system that are to be used in a power over Ethernet (PoE) network.

2. Description of the Related Art

In a power over Ethernet (PoE) network, electrical power may be transmitted along with data on a single cable. For example, by using a cable with a register jack (RJ) 45 connector to interconnect a power source equipment (e.g., a network switch) and a power device (e.g., a wireless router, a webcam, a voice over Internet Protocol (VoIP) device, etc.), the power source equipment is able to transmit data and power simultaneously to the power device through the cable. The PoE network allows the power device to operate without having to be connected electrically to a power source (e.g., a household power outlet, a battery, etc.).

A conventional Ethernet transformer is typically installed in the power source equipment for handling transmission of data and power. As various power devices are configured to incorporate more functionalities, power consumptions of the various power devices are accordingly increased. As a result, the power source equipments are required to be able to transmit a larger amount of power. In order to meet the larger power requirement, an iron core of the Ethernet transformer must be made larger in size, and copper coils with larger diameters must be adopted for winding. However, such changes on the Ethernet transformer also change an inductance, and in turn, an equivalent impedance of the Ethernet transformer. In such a case, in order to achieve impedance matching, an equivalent impedance of the power source equipment must be redesigned as well.

SUMMARY OF THE INVENTION

Therefore, one object of the present invention is to provide a network coupling device and a network coupling system that are capable of addressing the prior art drawbacks mentioned above.

According to one aspect, a network coupling device of the present invention is for use in a network system. The network coupling device comprises a transformer module for transmitting a network signal from the network system, and a power processing module coupled to the transformer module and configured to transmit a direct current power signal from the network system.

The transformer module and the power processing module satisfy a relation:

$$|Z_T - Z_{T+L}| \leq 0.25 Z_T$$

where $Z_T$ is an impedance of the transformer module when disconnected from the power processing module, and $Z_{T+L}$ is an effective impedance of the transformer module with the power processing module connected thereto.

According to another aspect, a network coupling system of the present invention is for coupling a power providing apparatus of a network system to a power receiving apparatus of the network system. The network coupling system comprises a first network coupling device and a second network coupling device.

The first network coupling device includes a supply-side transformer unit for transmitting a network signal from a network signal generator of the power providing apparatus, and a power transmitting unit coupled to the supply-side transformer unit and configured to transmit a direct current power signal from a power supplier of the power providing apparatus.

The second network coupling device includes a power receiving unit and a receiver-side transformer unit. The power receiving unit is configured for receiving the direct current power signal transmitted by the power transmitting unit and for transmitting the direct current power signal to a power receiver of the power receiving apparatus. The receiver-side transformer unit is for receiving the network signal transmitted by the supply-side transformer unit, and for transmitting the network signal to a network signal receiver of the power receiving apparatus.

The power transmitting unit and the supply-side transformer unit satisfy a relation $$|Z_{Ts} - Z_{Ts+L}| \leq 0.25 Z_{Ts}$$

where $Z_{Ts}$ is an impedance of the supply-side transformer unit when disconnected from the power transmitting unit, and $Z_{Ts+L}$ is an effective impedance of the supply-side transformer unit with the power transmitting unit connected thereto.

The power receiving unit and the receiver-side transformer unit satisfy a relation $$|Z_{Tr} - Z_{Tr+L}| \leq 0.25 Z_{Tr}$$

where $Z_{Tr}$ is an impedance of the receiver-side transformer unit when disconnected from the power receiving unit, and $Z_{Tr+L}$ is an effective impedance of the receiver-side transformer unit with the power receiving unit connected thereto.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 1:
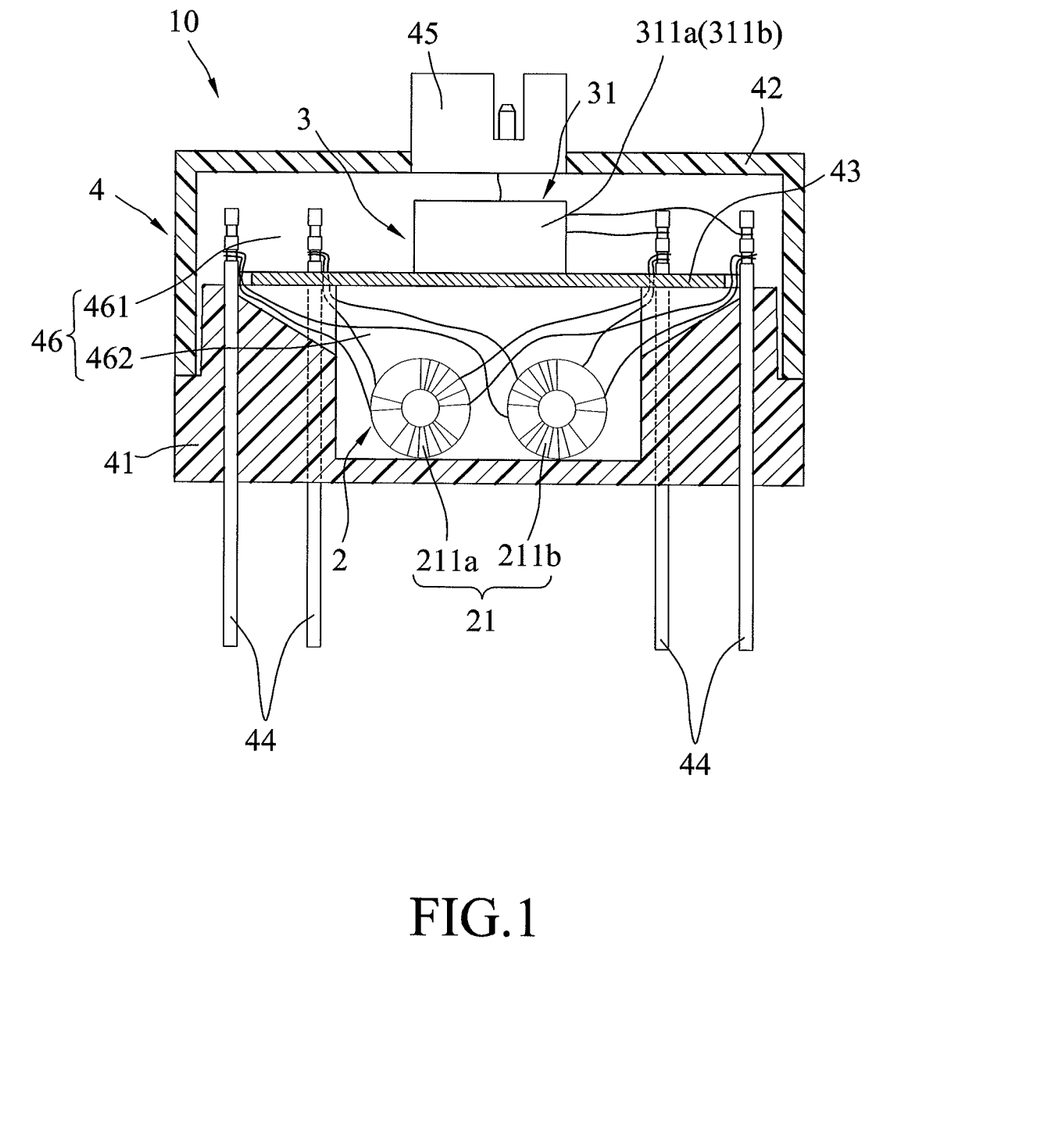
FIG. 1 is a sectional view of a first embodiment of a network coupling device according to the invention.
Figure 2:
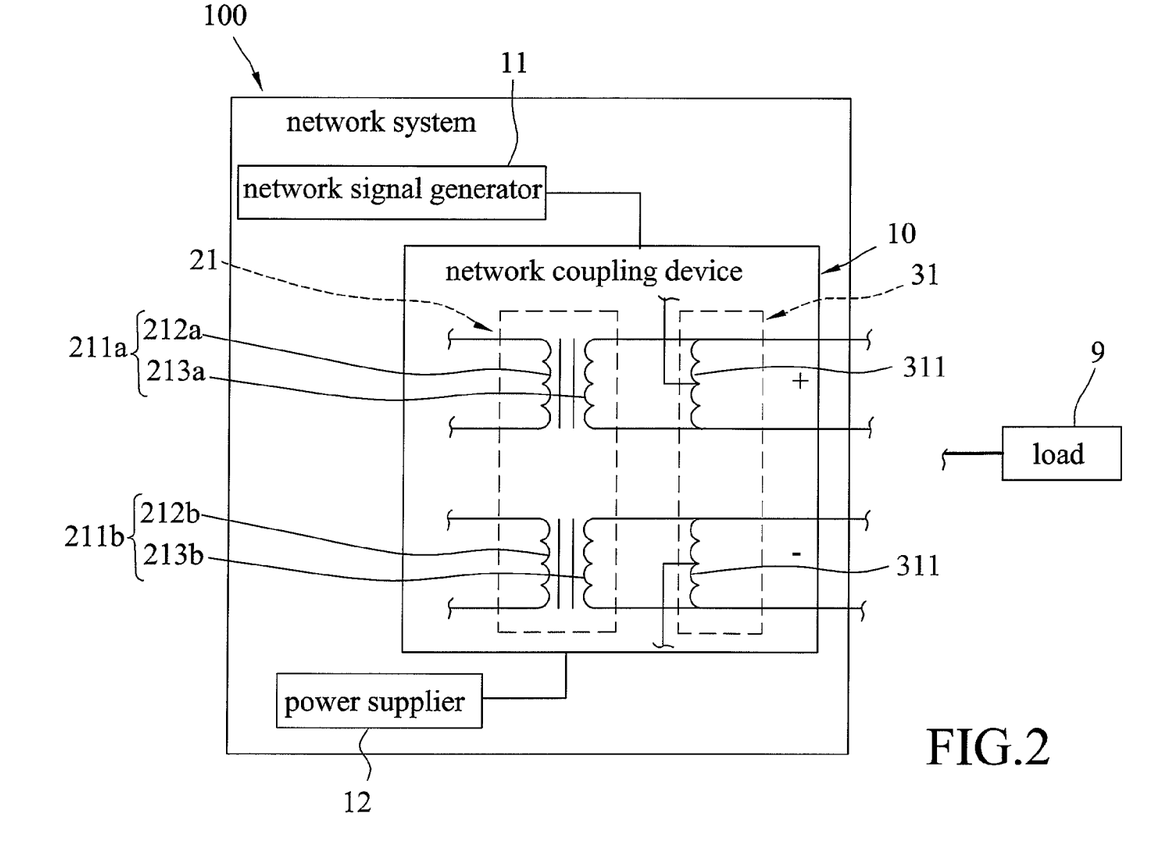
FIG. 2 is a schematic circuit diagram of the network coupling device of the first embodiment.

As shown in FIGS. 1 and 2, the first preferred embodiment of a network coupling device 10 according to the present invention is for use in a network system 100, and is configured to be coupled to a load 9. In this embodiment, the network system 100 is a power providing apparatus or a power source equipment (PSE) such as a power switch, and includes a network signal generator 11 and a power supplier 12. The network signal generator 11 is configured for generating a network signal. The power supplier 12 is configured for generating a direct current (DC) power signal.

The load 9 is a power receiving apparatus or a power device (PD), such as a wireless router, a webcam, a voice over Internet Protocol (VoIP) device, etc. The network system 100 may be electrically coupled to the load 9 using a cable with a register jack (RJ) 45 connector (not shown in the drawings) such that the network signal and the DC power signal can be transmitted to the load 9 via the cable. The network coupling device 10 comprises a housing 4, a trans former module 2 and a power process ing module 3.

The housing 4, in which the transformer module 2 and the power processing module 3 are disposed, includes a base 41, a cover 42, a circuit board 43, a plurality of connecting pins 44, and a connector seat 45.

Referring to FIG. 1, the base 41 and the cover 42 cooperate to define a containing space 46. The circuit board 43 is disposed in the containing space 46 and partitions the containing space 46 into an upper space 461 and a lower space 462. Each of the connecting pins 44 extends through the circuit board 43 and the base 41, thereby securing the circuit board 43 to the base 41. The connector seat 45 is disposed on the cover 42.

Referring to FIG. 2, the transformer module 2 is disposed in the lower space 462, and includes a supply-side transformer unit 21. In this embodiment, the supply-side transformer unit 21 may be embodied us ing an Ethernet transformer, and includes two transformers 211a and 211b. Each of the transformers 211a and 211b includes a first winding (212a, 212b) and a second winding (213a, 213b) that is inductively coupled to the first winding (212a, 212b). For the transformer 211a, the first winding 212a is coupled to the network signal generator 11 for receiving the network signal therefrom. The second winding 213a is then operable to output the network signal received by the first winding 212a. For the trans former 211b, the second winding 213b is operable to receive the network signal, which can be transmitted back to the network signal generator 11, thereby forming a circuit loop.

In use, the second windings 213a and 213b are configured to have a fixed inductance value.

The power processing module 3 in this embodiment is configured as an additional component coupled to the transformer module 2. Referring back to FIG. 1, the power processing module 3 is mounted to the circuit board 43 and disposed in the upper space 461. The power processing module 3 includes a power transmitting unit 31 coupled to the second windings 213a and 213b, and configured to be coupled to the power supplier 12 for receiving the DC power signal therefrom. The power transmitting unit 31 includes two inductive windings 311a and 311b (only one being illustrated in FIG. 1). The inductive winding 311a is configured to cooperate with the second winding 213a to generate a power line signal which is to be transmitted to the load 9. Specifically, the power line signal is generated by combining the network signal and the direct current power signal, and a DC offset voltage of the network signal is changed in the power line signal. That is to say, the power line signal has a network signal component and a power signal component.

The inductive winding 311b is configured to receive the power line signal for forming a circuit loop. In this embodiment, the inductive windings 311a and 311b are embodied using auto-transformers, but may be any other inductive components.

The inductive windings 311a and 311b are configured such that the transformer module 2 and the power processing module 3 satisfy a relation $$|Z_T - Z_{T+L}| \leq 0.25 Z_T$$

where $Z_T$ is an impedance of the transformer module 2 when disconnected from the power processing module 3, and $Z_{T+L}$ is an effective impedance of the transformer module 3 with the power processing module 3 connected thereto. In detail, each of $Z_T$ and $Z_{T+L}$ is an impedance measured while looking at the second windings 213a and 213b. Preferably, $|Z_T - Z_{T+L}| \leq 0.1 Z_T$.

The above relation may be attained by a number of ways. In this embodiment, assume each of the second windings 213a and 213b has an inductance of L. In one embodiment, the inductive windings 311a and 311b may be configured to have an inductance that is significantly larger than that of the second windings 213a and 213b (e.g., 10L). In this case, when the second windings 213a and 213b and the inductive windings 311a and 311b are coupled in parallel, respectively, the impedance $Z_{T+L}$ may be close to the impedance $Z_T$.

In another implementation, the inductances of the second windings 213a and 213b may be configured to be slightly larger (e.g., 1.2L). As such, the inductive windings 311a and 311b do not need to have an inductance significantly larger that of the second windings 213a and 213b (e.g., 3L) to result in an impedance $Z_{T+L}$ close to the impedance $Z_T$.

In use, the supply-side transformer unit 21 is operable to receive the network signal from the network signal generator 11, to output the network signal to the power transmitting unit 31, to receive a returned network signal transmitted from the load 9, and to transmit the returned network signal to the network signal generator 11. The DC power signal generated by the power supplier 12 is received by the power transmitting unit 31, which cooperates with the supply-side transformer unit 21 to generate the power line signal from the network signal and the DC power signal, and the power line signal is subsequently transmitted to the load 9. During transmission of the power line signal, by virtue of the impedance relation between the trans former module 2 and the power processing module 3, the effective impedance of the network coupling device 10 in this embodiment (i.e., the transformer module 2 coupled to the power processing module 3) does not differ substantially from an impedance of the transformer module 2. In other words, since the power processing module 3 is a component added to a conventional PSE (that includes an Ethernet transformer), the network coupling device 10 in this embodiment is capable of transmitting a larger amount of power while without introducing a significant change in impedance in relation to the Ethernet transformer, and as a result does not require additional impedance matching to be done on the load 9.

It is noted that the cable with the RJ45 connector includes eight electrical wires (inserted into an 8P8C modular plug), and the inductive windings 311a and 311b take up four of the eight electrical wires. That is, in other embodiments, up to another two inductive windings may be included to further increase the power transmission capability of the network coupling device 10.

In brief, the network coupling device 10 in this embodiment employs the power processing module 3 that is coupled to the transformer module 2, such that the power transmission capability of the network coupling device 10 may be increased to accommodate the requirements of the load 9. Additionally, since the power processing module 3 is dimensioned to be able to fit in the upper space 461, the housing 4 does not to be redesigned to accommodate the power processing module 3 as well.

Figure 3:
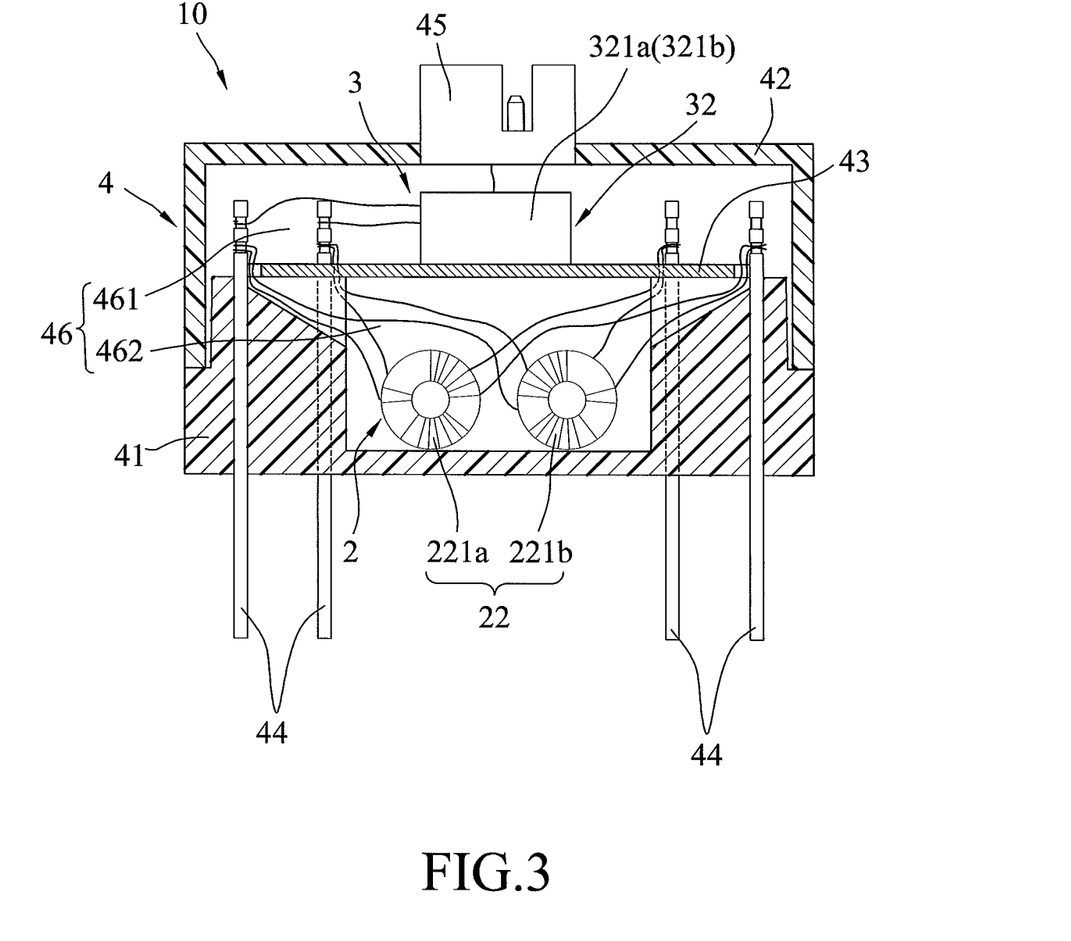
FIG. 3 is a sectional view of a second embodiment of a network coupling device according to the invention.
Figure 4:
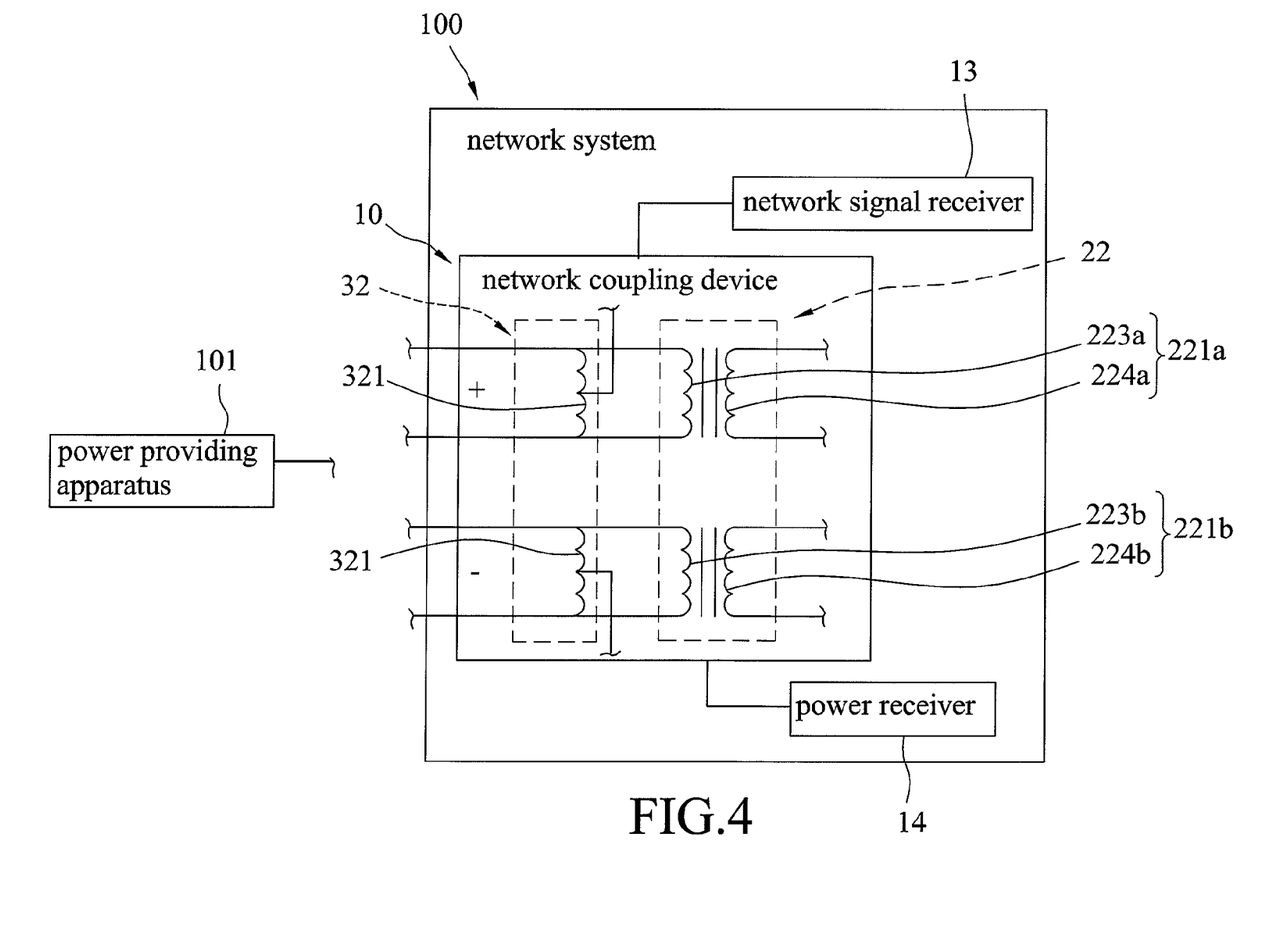
FIG. 4 is a schematic circuit diagram of the network coupling device of the second embodiment.

As shown in FIGS. 3 and 4, the second preferred embodiment of the network coupling device 10 according to the present invention has a structure similar to that of the first embodiment. The main difference between this embodiment and the previous embodiment resides in that the network system 100 is a power receiving apparatus or a power device that is coupled to a PSE 101 for receiving a power line signal therefrom. The network system 100 includes a network signal receiver 13 and a power receiver 14 for receiving a network signal component and a power signal component of the power line signal, respectively.

The power processing module 3 includes a power receiving unit 32 with two inductive windings 321a and 321b (only one illustrated in FIG. 3). The inductive winding 321a is configured to acquire the power signal component from the power line signal, and is configured to transmit the power signal component to the power receiver 14. The inductive winding 321b is configured to transmit the power signal component to the PSE 101, thereby forming a circuit loop. In this embodiment, the inductive windings 321a and 321b are embodied using auto-transformers, but may be any other inductive components.

The transformer module 2 includes a receiver-side transformer unit 22 that includes two transformers 221a and 221b. Each of the transformers 221a and 221b includes a first winding (223a, 223b) and a second winding (224a, 224b) inductively coupled to a respective one of the first windings (223a, 223b).

For the transformer 221a, the second winding 224a is configured to isolate the power signal component from the network signal component and to transmit the network signal component of the power line signal to the network signal receiver 13 of the network system 100. For the transformer 221b, the second winding 224b is configured to receive a network signal from the network signal receiver 13, and to output the network signal in order to form a circuit loop.

The inductive windings 321a and 321b are configured such that the transformer module 2 and the power processing module 3 satisfy a relation $$|Z_T - Z_{T+L}| \leq 0.25 Z_T$$

where $Z_T$ is an impedance of the transformer module 2 when disconnected from the power processing module 3, and $Z_{T+L}$ is an effective impedance of the transformer module 3 with the power processing module 3 connected thereto. In detail, each of $Z_T$ and $Z_{T+L}$ is an impedance measured while looking at the first windings 223a and 223b. Preferably, $|Z_T - Z_{T+L}| \leq 0.1 Z_T$.

The above relation may be attained by a number of ways. In this embodiment, assume each of the first windings 223a and 223b has an inductance of L'. In one embodiment, the inductive windings 321a and 321b may be configured to have an inductance that is significantly larger than that of the first windings 223a and 223b (e.g., 10L'). In this case, when the first windings 223a and 223b and the inductive windings 321a and 321b are coupled in parallel, respectively, the impedance $Z_{T+L}$ may be close to the impedance $Z_T$.

In another implementation, the inductances of the first windings 223a and 223b may be configured to be slightly larger (e.g., 1.2 L'). As such, the inductive windings 311a and 311b do not need to have an inductance significantly larger that of the first windings 223a and 223b (e.g., 3L') to result in an impedance $Z_{T+L}$ close to the impedance $Z_T$.

In use, the network coupling device 10 may be coupled to the PSE 101 using a cable with an RJ45 connector. In the case where the network coupling device 10 is embodied using a wireless router, upon acquisition of the power signal component from the power line signal, the power receiving unit 32 is configured to transmit the power signal component to the power receiver 14, which is capable of distributing the received power to other components of the network coupling device 10.

For example, the network coupling device 10 may include an antenna that is capable of transmitting the network signal wirelessly for providing wireless network connectivity to nearby electronic devices. The increased power consumption may be accommodated using the power processing module 3.

The second preferred embodiment has the same advantages as those of the first preferred embodiment. That is, when operating as a PD, use of the power processing module 3 allows the network coupling device 10 to incorporate more power-consuming functionalities (e.g., wireless network connectivity provision) without having to alter the structure or configuration of the transformer module 2.

Figure 5:
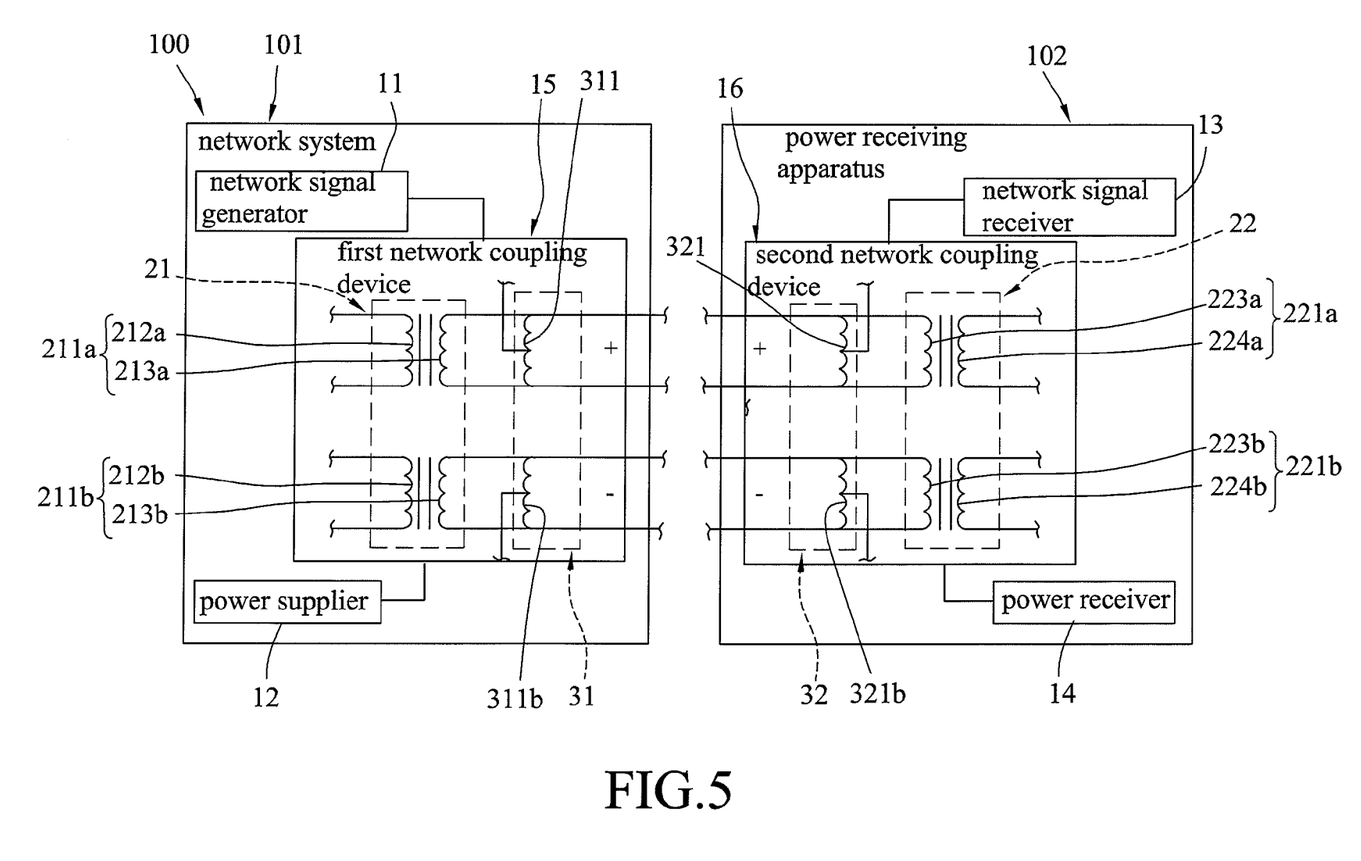
FIG. 5 is a schematic circuit diagram of an embodiment of a network coupling device according to the invention.

As shown in FIG. 5, the preferred embodiment of a network coupling system according to the present invention is for coupling a power providing apparatus 101 of a network system 100 to a power receiving apparatus 102 of the network system 100.

Similar to the previous embodiments, the power providing apparatus 101 and the power receiving apparatus 102 may be embodied using a PSE and a PD, respectively. The power providing apparatus 101 includes a network signal generator 11 for generating a network signal, and a power supplier 12 for generating a direct current power signal. The power receiving apparatus 102 includes a network signal receiver 13 and a power receiver 14.

The network coupling system comprises a first network coupling device 15 coupled to the power providing apparatus 101, and a second network coupling device 16 coupled to the power receiving apparatus 102. The first network coupling device 15 includes a supply-side transformer unit 21 for transmitting the network signal from the network signal generator, and a power transmitting unit 31 coupled to the supply-side trans former unit 21 and configured to transmit the direct current power signal from the power supplier 12.

The second network coupling device 16 includes a power receiving unit 32 and a receiver-side transformer unit 22. The power receiving unit 32 is configured for receiving the direct current power signal transmitted by the power transmitting unit 31 and for transmitting the direct current power signal to the power receiver 14. The receiver-side transformer unit 22 is for receiving the network signal transmitted by the supply-side transformer unit 21, and for transmitting the network signal to the network signal receiver 13.

In this embodiment, the power transmitting unit 31 and the supply-side transformer unit 21 are configured in a manner to satisfy the relation:

$$|Z_{Ts} - Z_{Ts+L}| \leq 0.25 Z_{Ts}$$

where $Z_{Ts}$ is an impedance of the supply-side transformer unit 21 when disconnected from the power transmitting unit 31, and $Z_{Ts+L}$ is an effective impedance of the supply-side transformer unit 21 with the power transmitting unit 31 connected thereto.

Additionally, the power receiving unit 32 and the receiver-side transformer unit 22 satisfy a relation $$|Z_{Tr} - Z_{Tr+L}| \le 0.25 Z_{Tr}$$

where $Z_{Tr}$ is an impedance of the receiver-side transformer unit 22 when disconnected from the power receiving unit 32, and $Z_{Tr+L}$ is an effective impedance of the receiver-side transformer unit 22 with the power receiving unit 32 connected thereto. Preferably, $|Z_T - Z_{T+L}| \le 0.1 Z_T$ and $|Z_{Tr} - Z_{Tr+L}| \le 0.1 Z_{Tr}$.

The configurations and operations of the first and second network coupling devices 15 and 16 are similar to those of the network coupling devices 10 described in the first and second embodiments, respectively.

As a result, when the power providing apparatus 101 and the power receiving apparatus 102 are coupled via the first and second network coupling devices 15 and 16, the power transmitting unit 31 is operable to generate a power line signal based on the network signal and the power signal, and the power line signal is transmitted to the power receiving unit 32. The power receiving unit 32 is configured to acquire the power signal component from the power line signal, and to transmit the power signal component to the power receiver 14. The receiver-side transformer unit 22 is configured to isolate the power signal component from the network signal component and to transmit the network signal component of the power line signal to the network signal receiver 13.

The network coupling system of this embodiment has the same advantages as those of the first and second preferred embodiments. That is, addition of the power transmitting unit 31 and the power receiving unit 32, with the above impedance relations satisfied, allows more power to be transmitted between the power providing apparatus 101 and the power receiving apparatus 102 without requiring impedance matching.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A network coupling device for use in a network system, said network coupling device comprising:
   a transformer module for transmitting a network signal from the network system; and
   a power processing module coupled to said transformer module and configured to transmit a direct current power signal from the network system;
   wherein said transformer module and said power processing module satisfy a relation $$|Z_T - Z_{T+L}| \le 0.25 Z_T$$

where $Z_T$ is an impedance of said transformer module when disconnected from said power processing module, and $Z_{T+L}$ is an effective impedance of said transformer module with said power processing module connected thereto.

2. The network coupling device of claim 1, wherein said transformer module includes a supply-side transformer unit, said supply-side transformer unit including a first winding configured to be coupled to a network signal generator of the network system for receiving the network signal therefrom, and a second winding inductively coupled to said first winding for outputting the network signal.

3. The network coupling device of claim 2, wherein said power processing module includes a power transmitting unit coupled to said second winding and configured to be coupled to a power supplier of the network system for receiving the direct current power signal therefrom, said power transmitting unit cooperating with said second winding to generate a power line signal which combines the network signal and the direct current power signal and in which a direct current offset voltage of the network signal is changed.

4. The network coupling device of claim 3, wherein each of $Z_T$ and $Z_{T+L}$ is an impedance measured while looking at said second winding, and $|Z_T - Z_{T+L}| \le 0.1 Z_T$.

5. The network coupling device of claim 3, wherein said power transmitting unit includes an inductive winding coupled in parallel to said second winding.

6. The network coupling device of claim 1, which is configured to receive a power line signal having a network signal component and a power signal component, wherein said power processing module includes a power receiving unit that is configured to acquire the power signal component from the power line signal and that is configured to transmit the power signal component to a power receiver of the network system.

7. The network coupling device of claim 6, wherein said transformer module includes a receiver-side transformer unit that includes a first winding coupled to said power receiving unit and configured to receive the power line signal, and a second winding inductively coupled to said first winding and configured to isolate the power signal component from the network signal component and to transmit the network signal component of the power line signal to a network signal receiver of the network system.

8. The network coupling device of claim 7, wherein each of $Z_T$ and $Z_{T+L}$ is an impedance measured while looking at said first winding, and $|Z_T - Z_{T+L}| \le 0.1 Z_T$.

9. The network coupling device of claim 7, wherein said power receiving unit includes an inductive winding coupled in parallel to said first winding.

10. The network coupling device of claim 1, further comprising a housing, in which said transformer module and said power processing module are disposed.

11. A network coupling system for coupling a power providing apparatus of a network system to a power receiving apparatus of the network system, said network coupling system comprising:
    a first network coupling device that includes
       a supply-side transformer unit for transmitting a network signal from a network signal generator of the power providing apparatus, and
       a power transmitting unit coupled to said supply-side trans former unit and configured to transmit a direct current power signal from a power supplier of the power providing apparatus; and
    a second network coupling device that includes
       a power receiving unit configured for receiving the direct current power signal transmitted by said power transmitting unit and for transmitting the direct current power signal to a power receiver of the power receiving apparatus, and
       a receiver-side transformer unit for receiving the network signal from said supply-side transformer unit, and for transmitting the network signal to a network signal receiver of the power receiving apparatus;
    wherein said power transmitting unit and said supply-side transformer unit satisfy a relation $$|Z_{Ts}-Z_{Ts+L}| \leq 0.25 Z_{Ts}$$

where $Z_{Ts}$ is an impedance of said supply-side transformer unit when disconnected from said power transmitting unit, and $Z_{Ts+L}$ is an effective impedance of said supply-side transformer unit with said power transmitting unit connected thereto; and wherein said power receiving unit and said receiver-side transformer unit satisfy a relation $$|Z_{Tr}-Z_{Tr+L}| \leq 0.25 Z_{Tr}$$

where $Z_{Tr}$ is an impedance of said receiver-side transformer unit when disconnected from said power receiving unit, and $Z_{Tr+L}$ is an effective impedance of said receiver-side transformer unit with said power receiving unit connected thereto.

12. The network coupling system of claim 11, wherein said supply-side transformer unit of said first network coupling device includes a first winding configured to be coupled to the network signal generator for receiving the network signal therefrom, and a second winding inductively coupled to said first winding for outputting the network signal.

13. The network coupling system of claim 12, wherein said power transmitting unit is coupled to said second winding and is configured to be coupled to the power supplier for receiving the direct current power signal therefrom, and said power transmitting unit cooperates with said second winding to generate a power line signal which combines the network signal and the direct current power signal and in which a direct current offset voltage of the network signal is changed.

14. The network coupling system of claim 13, wherein each of $Z_{Ts}$ and $Z_{Ts+L}$ is an impedance measured while looking at said second winding, and $|Z_{Ts}-Z_{Ts+L}| \leq 0.1 Z_{Ts}$.

15. The network coupling system of claim 13, wherein:
said power receiving unit of said second coupling device is configured to receive the power line signal having a network signal component and a power signal component, and is configured to acquire the power signal component from the power line signal, and to transmit the power signal component to the power receiver; and
said receiver-side transformer unit includes a third winding coupled to said power receiving unit and configured to receive the power line signal, and a fourth winding inductively coupled to said third winding and configured to isolate the power signal component from the network signal component and to transmit the network signal component of the power line signal to the network signal receiver.

16. The network coupling system of claim 15, wherein each of $Z_{Tr}$ and $Z_{Tr+L}$ is an impedance measured while looking at said third winding, and $|Z_{Tr}-Z_{Tr+L}| \leq 0.1 Z_{Tr}$.

17. The network coupling system of claim 15, wherein each of said power transmitting unit and said power receiving unit includes an inductive winding coupled in parallel to a respective one of said first winding and said third winding.

* * * * *